Aug. 20, 1963 P. H. VALENTYNE ETAL 3,101,143
DOUGH PROCESSING APPARATUS
Filed April 10, 1961 3 Sheets-Sheet 1
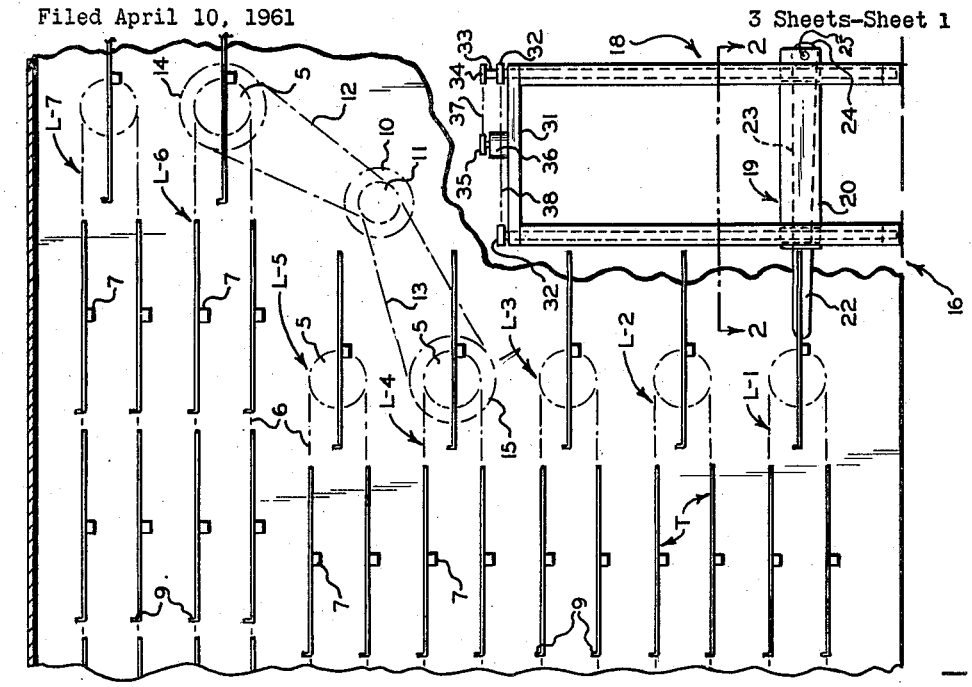
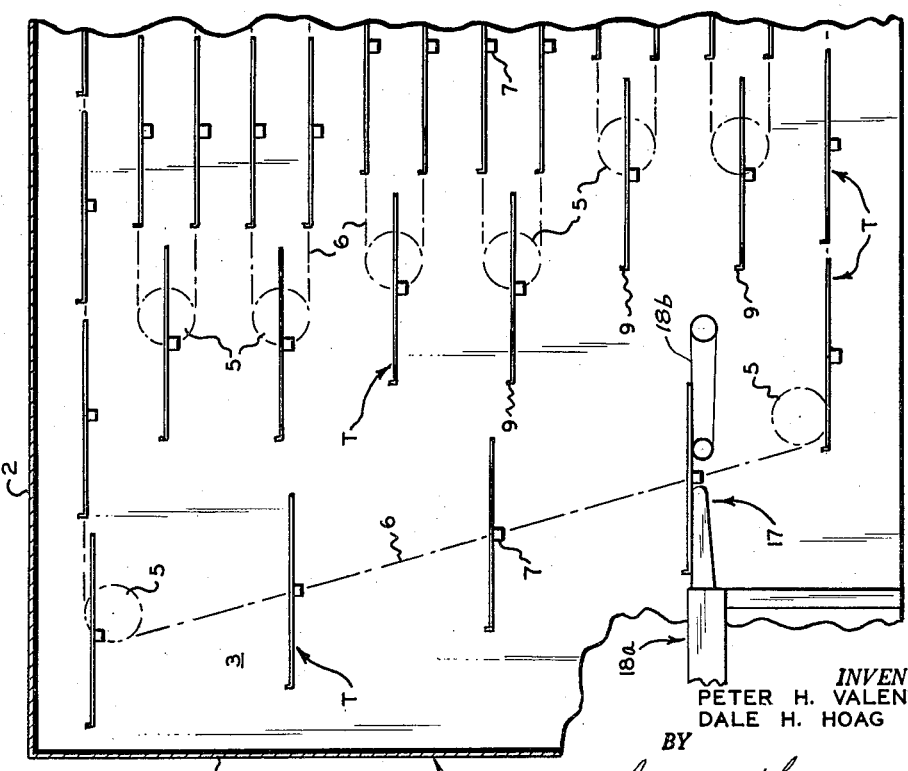
FIG. 1
INVENTORS
PETER H. VALENTYNE
DALE H. HOAG
BY
ATTORNEYS

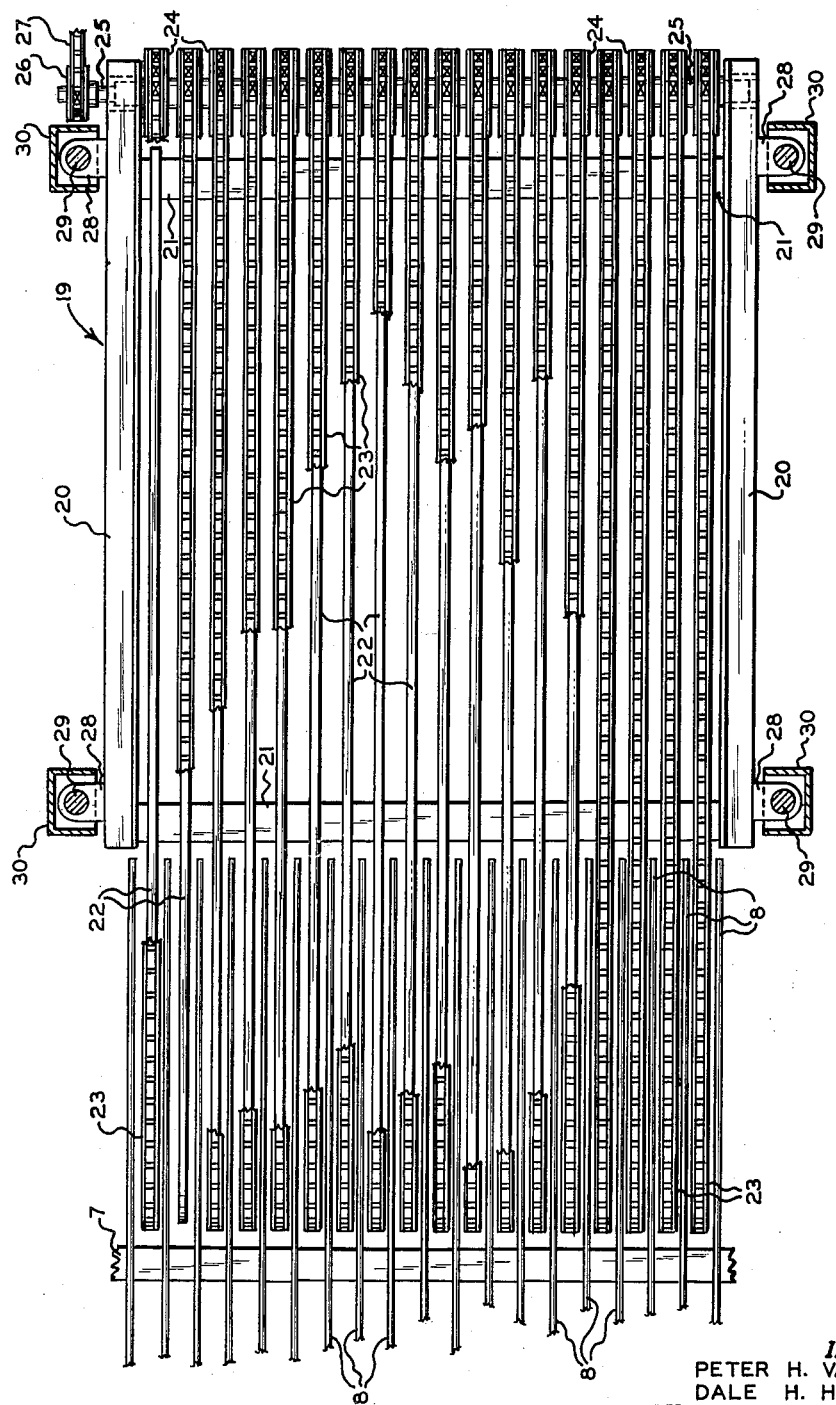

Aug. 20, 1963  P. H. VALENTYNE ETAL  3,101,143
DOUGH PROCESSING APPARATUS

Filed April 10, 1961  3 Sheets-Sheet 3

INVENTORS
PETER H. VALENTYNE
DALE H. HOAG
BY

ATTORNEYS

United States Patent Office 3,101,143
Patented Aug. 20, 1963

3,101,143
DOUGH PROCESSING APPARATUS
Peter H. Valentyne and Dale H. Hoag, Saginaw, Mich., assignors to Baker Perkins Inc., Saginaw, Mich., a corporation of New York
Filed Apr. 10, 1961, Ser. No. 101,940
7 Claims. (Cl. 198—24)

This invention relates to apparatus for processing dough products or the like and more particularly the invention pertains to apparatus particularly adapted for use in automatic bakery machinery such as proofers, coolers, and like apparatus wherein bakery products are supported on trays for movement through a housing or chamber in which temperature, humidity, and like conditions may be regulated to treat the dough products in the manner they require.

Most, if not all, bakeries will produce several different kinds of products each day, such as bread, cakes, and rolls. The time required to prove, bake and cool such different products varies. Proofers, coolers, ovens and the like usually are constructed in such manner that their maximum cycle time corresponds substantially to the length of time required to process the product requiring the greatest processing time. If the same piece of equipment is to be used for processing a plurality of bakery goods, a problem arises with respect to the length of time that some of the products remain in the apparatus.

The difficulty in designing one piece of machinery capable of efficient use with different kinds of products is compounded in those instances where the products are supported on individual trays, as opposed to endless belts or similar conveyors. This is because the loading of the trays must be timed to coincide with the arrival of the trays at a loading station and preferably is accomplished while all parts of the conveying system are moving continuously. The disclosed apparatus, by means of which the trays are loaded and unloaded, may be of several types but must be so designed that the product may be properly positioned on the tray when loaded.

An object of this invention is to provide dough processing apparatus including product supporting trays movable in a closed circuit and wherein the effective length of the circuit may be varied from one product to another so as to vary the length of time a given product remains in the apparatus.

Another object of the invention is to provide apparatus of the kind referred to having simplified transfer means for loading and unloading the trays.

A further object of the invention is to provide dough processing apparatus of the character described wherein the trays move through a series of vertically spaced loops and wherein the product transfer mechanism is adjustable from one loop to another so as thereby to vary the effective length of the circuit between the loading station and the unloading station.

Other objects and advantages of the invention will be pointed out in detail or will become apparent from the following description when it is considered in conjunction with the appended claims and the accompanying drawings, in which:

FIGURE 1 is a fragmentary, sectional view through a proofer housing diagrammatically illustrating an endless train of product supporting trays and further illustrating the association between the trays and their loading and unloading mechanisms;

FIGURE 2 is an enlarged, sectional view taken on the line 2—2 of FIGURE 1;

Figure 3:
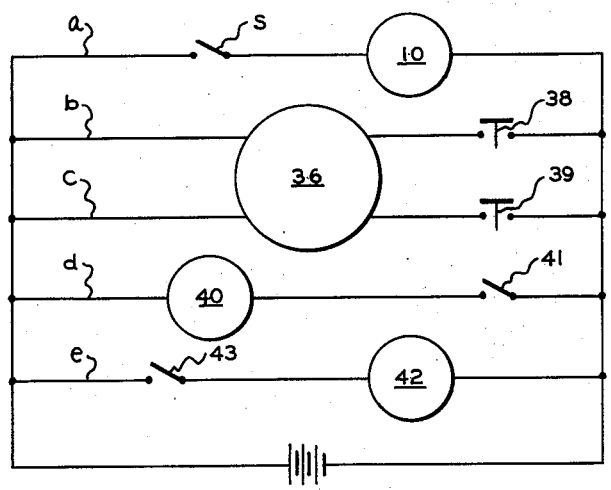
FIGURE 3 illustrates a typical electric control circuit.

Apparatus constructed in accordance with the embodiment of the invention illustrated in FIGURES 1-3 is adapted for use in conjunction with a housing 1 having top, side, and front and rear end walls 2, 3, and 4, respectively, defining a proofing enclosure in which is mounted a plurality of pairs of sprocket wheels 5 around which is trained a pair of endless link chains 6 providing a closed circuit or path having a number of vertically spaced loops L–1, L–2, L–3, and so on. At spaced intervals along the chains 6 are mounted cross bars 7 each of which supports and interconnects a plurality of transversely spaced, parallel rods or bars 8 which together constitute an upright tray T. One end of each of the rods 8 may be upturned to provide an end flange 9 for each tray.

Means is provided for driving the conveyor chains 6 and the trays T and comprises an electric motor 10 having a pair of driven sprocket wheels 11 around which may be trained chains 12 and 13, the chains also being trained around driven sprocket wheels 14 and 15 which are keyed to selected sprocket wheels 5. The construction and arrangement of the parts thus far described are such that each tray T passes in succession from a loading station, designated generally by the reference character 16, through each of the loops of the conveyor to a discharge station, designated generally by the reference character 17, and thence back to the loading station. Preferably, the trays move continuously and at constant speed.

The loading station 16 preferably is located at one end of the housing 1 and the discharge station 17 is located at the opposite end of the housing. It will be understood that appropriate openings will be located at each of the loading and unloading stations to permit the products to enter and leave the housing.

Loading transfer apparatus 18 is provided at the loading station 16 and may comprise a carriage frame 19 having a pair of parallel side bars 20 interconnected at their ends by cross bars 21. Parallel to and between the side rails 20 is mounted a plurality of elongated chain guides 22 and around each of which is trained a link chain 23. Each chain also is trained around a sprocket wheel 24 fixed on a rotatable shaft 25 that is journaled in bearings mounted in the side rails 20. One end of the shaft 25 projects beyond a side rail 20 and carries a sprocket wheel 26 around which is trained a chain 27 that may be driven by an electric motor (not shown) so as to cause simultaneous driving of each of the chains 23 in such direction as to cause products on the upper runs of the chains to be delivered into the housing 1. The loading transfer mechanism will be supplied with products from a conveyor or the like located adjacent to and discharging onto the chains 23, but such delivery conveyor is not disclosed in the drawings because it may be any one of a number of conventional kinds.

Each of the side bars 20 of the frame 19 is provided with a pair of laterally projecting ears 28 and each ear 28 is provided with a threaded opening which receives a correspondingly threaded screw shaft 29. Each shaft is journaled at its lower end in a bearing carried at the bottom of an upright frame member 30. The upper ends of the frame members 30 are secured to a horizontal platform 31 and the upper end of each shaft 29 extends through an opening in the platform and is provided with a sprocket wheel 32. One of the shafts 29 is provided with an extension 33 on which is fixed a sprocket wheel 34. At the level of the sprocket wheel 34 is another sprocket wheel 35 which is fixed to the shaft of a reversible electric motor 36 that is mounted on the platform 31. A sprocket chain 37 is trained around the sprockets 34 and 35, and a chain 38 is trained around the sprockets 32. The arrangement is such that driving of the motor 35 causes rotation of each of the shafts 29 so as to effect raising and lowering of the frame 19 and, consequently, raising and lowering of the loading transfer apparatus.

The discharge transfer apparatus 18a may be constructed exactly like the loading transfer mechanism 18 and it may or may not be vertically adjustable, as desired. It may include an additional endless conveyor member 18b including chains 23a driven from the shaft 25 and supported by the carriage frame 19.

As is illustrated in FIGURE 1, the loading and unloading transfer mechanisms lie in the path of trays passing the loading and unloading stations, respectively. Accordingly, the spacing of the adjacent chain guides 22 should be offset relatively to the rods 8 of the trays T and so spaced as to pass between the rods so as to permit the trays to move past the loading and unloading stations without interference from the transfer devices.

When the apparatus is used in processing loaves of bread, for example, pan sets containing dough will be delivered to the loading station 16 by conventional conveying apparatus. The conveyor motor 10 will be operating so that the trays T pass in succession past the loading transfer means. The driving motor for the loading transfer means also will be in operation so that pans containing the dough are delivered into the housing 1 and into the path of a tray approaching the loading zone. As a tray T reaches the end of the loop adjacent the loading transfer mechanism it will move upwardly, with a substantial portion of the length of its rods 8 passing between the chain guides 22 so as to transfer a set of pans from the loading conveyor to the tray T. This operation will be repeated successively with each of the trays T. In order to assure smooth functioning of the apparatus, the speed of the conveyor motor 10 should be synchronized with the speed of the loading mechanism driving motor so that a tray T is in a position to receive goods from the transfer loading apparatus each time a set of pans is delivered to the discharge end of the loading transfer mechanism. Preferably the relative speeds of the conveying devices are such that a tray will reach the transfer point at such time that the pan set will overhang the discharge end of the chains 23 a slight amount so as to enable the set of pans to be received equidistant the ends of each tray T.

From the loading station 16 the goods supported on a tray will pass successively vertically through each of the loops L-1—L-7, the trays T always remaining in an upright position. When a tray reaches the end of the upper run of the loop L-7, it moves downwardly past the unloading station 17 so that the driven conveyor chains of the unloading transfer device 18a pass between the rods 8 of the tray and lift the pan set from the tray and convey it out of the housing for delivery to another conveyor (not shown). The speed at which the unloading mechanism conveyor is driven is not critical, so long as goods deposited on the unloading transfer conveyor are removed from the path of approaching trays in sufficient time to avoid interference therewith.

From the discharge station each tray passes in succession back to the loading station, where the cycle is repeated.

When the production of bread loaves ceases in favor of the production of some other form of baked product, such as rolls, for example, it ordinarily will not be advisable to permit such products to remain within the proofer shown for as long a time as the loaves of bread were permitted to remain. Accordingly, when the last group of bread loaves has been loaded on a tray, loading operations may be interrupted until such time as the last loaded tray has progressed through a desired number of loops. Thereafter, the driving motor 36 may be started and run in such direction as to cause the carriage frame 19 to be raised from a position adjacent the loop L-1 to a position adjacent either of the loops L-2 or L-3. When the carriage 19 has reached its adjusted position, loading operations once again may be begun with the tray following the tray carrying the last loaf of bread in a manner exactly like that previously described so as to load successive trays with pans containing the rolls or the like. The vertical adjustment of the carriage 19 will, in effect, shorten the length of the conveyor extending between the loading station and the unloading station inasmuch as it will no longer require as much time for a tray to travel the distance from the loading station to the unloading station. Thus, the length of time a product will remain in the processing chamber when the carriage has been adjusted to either of the loops L-2 or L-3 will be less than the length of time associated with the processing of goods loaded at the loop L-1.

In order to avoid complications of synchronism, the motor 36 which adusts the carriage 19 upwardly may operate the carriage at a speed related to the speed of travel of the trays. In FIGURE 3 we have shown a circuit diagram which is typical of one which may be employed. Motor 10 in circuit line a operates continuously with start switch S closed, whereas motor 36 is entergized only when one of the spring returned push buttons 38 and 39 is depressed to close either carriage raising circuit line b or reversing circuit line c which is connected to energize motor 36 in the conventional manner to reverse the direction of rotation of motor 36 and lower carriage 19. The speed of travel of carriage 19 upwardly may be correlated with the travel of trays T such that, if carriage 19 has just finished loading the last of a run of bread pans to a tray T at the front of loop L-1, the carriage 19 will reach loop L-2 or L-3 as desired at the time the tray T following the last loaded tray is presented for loading at the front end of either loop L-2 or L-3. The speed of travel of carriage 19 downwardly is much faster. The motor 40 in circuit line d driving chain 27 drives it at a speed corresponding to the spacing of trays T so that the correspondingly spaced products on chains 23 successively reach a position at the inner end of chains 23 to be loaded to the trays at the time the trays T arrive successively at the front end of the particular loop opposite carriage 19. Switch 41 can be disengaged to stop the travel of chains 23 as desired. The chains 23 and 23a of unit 18a are similarly driven, of course, by an electric motor 42 in circuit line c and deenergizing switch 43 can be provided. Thus, the loading apparatus will be in condition for immediate operation upon its arrival at any of its adjusted positions.

Units 18 and 18a could also be reversed in the sense that 18a may be employed to load products to the trays and unit 18 to unload them at one of the loops L-1, L-2, and L-3. This design would necessitate only a reversal of the direction of travel of the chains 23 and the use of trays T which do not have projections.

Figure 4:
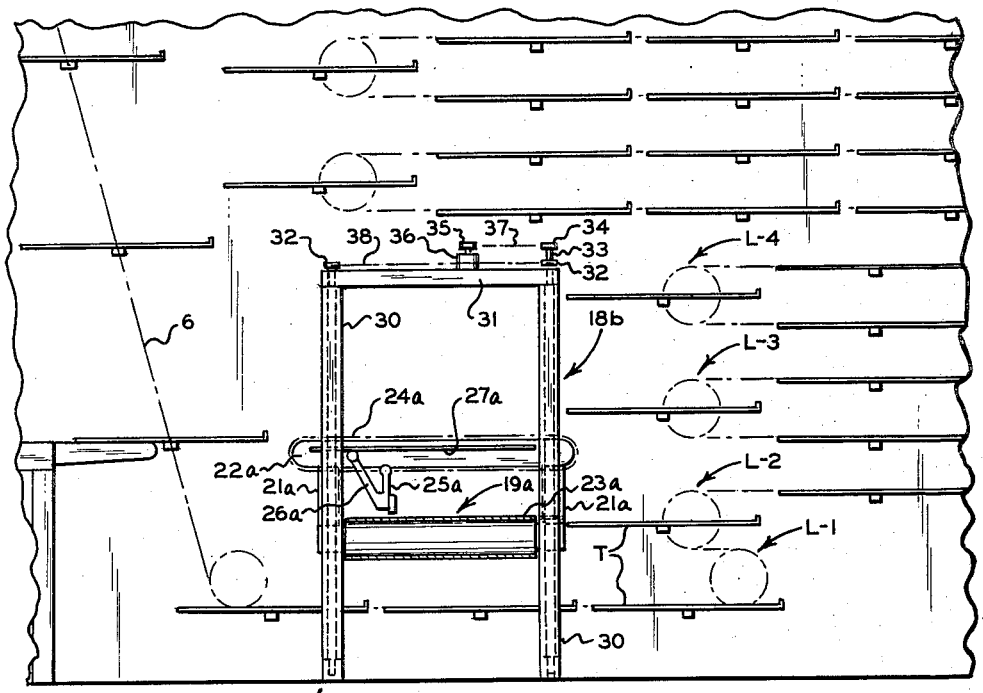
FIGURE 4 is a view similar to FIGURE 1, but illustrating a modified form and arrangement of the apparatus.

In FIGURE 4 there is disclosed a modified embodiment and arrangement of the loading transfer apparatus, but all other parts of the mechanism are the same as has been described hereinabove. In the embodiment shown in FIGURE 4, a loading station 16a is provided at a position inwardly of the proofer housing and between the discharge run 6 of the conveyor and the series of loops L-1, L-2, L-3 and L-4. In this embodiment of the invention the spacing between the conveyor run 6 and the series of lower loops L-1—L-4 must be such as to accommodate a loading transfer apparatus 18b, but no other modification of the proofer apparatus is required.

The transfer apparatus 18b is generally similar to the apparatus 18 previously described and similar parts are identified by similar reference characters. The apparatus 18b includes a carriage 19a similar to the carriage 19 and composed of side members 20a that are vertically adjustable in the same manner as the carriage 19. The carriage 19a is associated with a conveyor having an upper run 23a adapted to receive goods which enter the proofer housing through an appropriate opening (not shown) in one of the side walls. Above the carriage 19a and supported by the latter by means of suitable uprights 21a is a frame 22a around which extends an endless chain 24a. Fixed to the chain is a pusher member 25a having an arm 26a which bears against and is guided by a guide plate 27a fixed to the frame 22a. The chain 24a is adapted to be driven by a motor similar to the motor 40 and it can be driven continuously in one direction or it can be reciprocated. When the chain is driven continuously in one direction, the pusher member 25 periodically will sweep across the upper run of the carriage 19a and will push goods therefrom onto the adjacent tray T at the loading station. Should the chain be driven back and forth, the pusher member 25 cyclically will be driven in a direction such as to push goods from the conveyor 23a to the adjacent tray T.

The relative speeds of operation of the loading transfer apparatus 18b and the tray conveyor mechanism may be correlated in the manner previously described. The effective distance between the loading station 18b and the discharge station 18a may be adjusted by vertical adjustment of the carriage and pusher apparatus 25a vertically from one loop to another in the same manner as vertical adjustment of the carriage 19 was achieved in the embodiment of the invention disclosed in FIGURE 1.

One of the advantages of the placement of the loading transfer mechanism as illustrated in FIGURE 4 is that less time is required for a tray to traverse the distance from the discharge station to the loading station than is required when the apparatus is constructed in accordance with the FIGURE 1 embodiment. In other words, the lower run of the tray conveyor can be made much shorter than is the case with the FIGURE 1 embodiment, with the result that the idle time of any given tray is materially reduced.

The disclosed embodiment is representative of a presently preferred form of the invention, but is intended to be illustrative rather than definitive thereof. The invention is defined in the claims.

We claim:

1. Apparatus for processing dough products or the like comprising a housing; endless conveyor means; means mounting said conveyor means in said housing for movement in a continuous path having a plurality of spaced superposed loops from a loading station to a discharge station and thence back to said loading station; a plurality of separate, product supporting trays mounted on said conveyor means for movement therewith; first product transfer means at said loading station for loading products on successive trays; second product transfer means at said discharge station for removing products from said trays; means for driving said conveyor means; means for driving each of said transfer means; and means operatively connected at least to one of said transfer means for shifting the latter to a position adjacent any one of the ends of a number of said loops of said path, whereby to vary the length of said path between said stations.

2. Apparatus for processing dough products or the like comprising a housing; endless conveyor means; means mounting said conveyor means in said housing for movement in a continuous path having a plurality of spaced superposed loops from a loading station to a discharge station and thence back to said loading station; a plurality of separate, spaced apart, product supporting trays mounted on said conveyor means for movement therewith; first product transfer means at said loading station for loading products on successive trays; second product transfer means at said discharge station for removing products from successive trays; means for driving said conveyor means; means for driving each of said transfer means; and means operatively connected at least to one of said transfer means operating said transfer means to selectively transfer products between any one of a number of said loops of said path near end portions of the loops, whereby to vary the length of said path between said stations.

3. Apparatus as set forth in claim 2 wherein said one of said transfer means is said first transfer means.

4. Apparatus for processing dough products or the like comprising a housing; endless conveyor means; means mounting said conveyor means in said housing for movement in a continuous path having a plurality of vertically spaced loops, said path extending from a loading station to a discharge station and thence back to said loading station; a plurality of separate, spaced apart, upright trays mounted on said conveyor means for movement therewith always in an upright position; loading transfer means at said loading station; discharge transfer means at said discharge station; means for driving said conveyor means so that said trays pass in succession past said stations; driving means connected to each of said transfer means operable in timed relation to the arrival of a tray at either of said stations to drive the associated transfer means and effect transfer of products; means mounting said loading transfer means for vertical movements to a position adjacent any one of the ends of a number of said loops whereby to vary the length of said path from said loading station to said discharge station; and operating means connected to said loading transfer means for effecting said vertical movements thereof.

5. Apparatus as set forth in claim 4 wherein said operating means is operable to shift said loading transfer means from one loop to another loop in timed relation to the departure of a tray from said one loop and the arrival of a tray at said another loop.

6. Apparatus for processing dough products or the like comprising a housing; endless conveyor means; means mounting said conveyor means in said housing for movement in a continuous path having a plurality of vertically spaced loops, said path extending from a loading station to a discharge station and thence back to said loading station; a plurality of separate, spaced apart, upright trays mounted on said conveyor means for movement therewith always in an upright position, each of said trays being composed of a plurality of spaced apart elements connected to one another between their ends; loading transfer means at said loading station adjacent one of said loops and extending into the path of movement of trays passing said loading station, said loading transfer means comprising a plurality of conveyor elements spaced apart from one another a distance to pass between adjacent elements of said trays; discharge transfer means at said discharge station in the path of trays passing said discharge station and comprising a plurality of conveyor elements spaced apart from one another a distance to pass between adjacent elements of said trays; means for driving said conveyor means so that said trays pass in succession past said stations; driving means connected to said loading transfer means operable in timed relation to the arrival of each tray at said loading station for driving said loading transfer means to deliver a product into the path of said tray; driving means connected to said discharge transfer means for operating the latter to remove said product from each tray as the latter passes said discharge station; and means mounting said loading transfer means for vertical movements from a position adjacent an end of said one of said loops to a position adjacent an end of a selected one of the other loops, whereby to vary the length of said path between said stations.

7. Apparatus for processing dough products or the like comprising a housing; endless conveyor means; means mounting said conveyor means in said housing for movement in a continuous path having a plurality of generally vertically spaced loops from a loading station to a discharge station and thence back to said loading station; a plurality of separate, product supporting trays mounted on said conveyor means for movement therewith; first product transfer means at said loading station for loading products on successive trays, said first transfer means being positioned inwardly of the path traversed by said trays; second product transfer means at said discharge station for removing products from said trays; means for driving said conveyor means; means for driving each of said transfer means; and means operatively connected to said first transfer means for shifting the latter to a position adjacent any one of a number of the ends of said loops of said path, whereby to vary the length of said path between said stations.

References Cited in the file of this patent

UNITED STATES PATENTS

| | | |
|---|---|---|
| 1,109,963 | Clark | Sept. 8, 1914 |

FOREIGN PATENTS

| | | |
|---|---|---|
| 942,498 | Germany | May 3, 1956 |
| 60,219 | Netherlands | Nov. 15, 1947 |